United States Patent
Hrcka

(10) Patent No.: US 9,489,756 B2
(45) Date of Patent: Nov. 8, 2016

(54) GRAPH BASED DEGREE OF FREEDOM COUNTER FOR TWO DIMENSIONAL DRAWINGS

(71) Applicant: Autodesk, Inc., San Rafael, CA (US)

(72) Inventor: Michal Hrcka, Decin (CZ)

(73) Assignee: Autodesk, Inc., San Rafael, CA (US)

( * ) Notice: Subject to any disclaimer, the term of this patent is extended or adjusted under 35 U.S.C. 154(b) by 780 days.

(21) Appl. No.: 13/755,882

(22) Filed: Jan. 31, 2013

(65) Prior Publication Data

US 2013/0194275 A1    Aug. 1, 2013

Related U.S. Application Data

(60) Provisional application No. 61/592,960, filed on Jan. 31, 2012.

(51) Int. Cl.
*G06T 11/00* (2006.01)
*G06F 17/50* (2006.01)
*G06T 11/20* (2006.01)

(52) U.S. Cl.
CPC .......... *G06T 11/206* (2013.01); *G06F 17/509* (2013.01); *G06F 17/5086* (2013.01); *G06T 11/00* (2013.01); *G06F 2217/06* (2013.01)

(58) Field of Classification Search
None
See application file for complete search history.

(56) References Cited

U.S. PATENT DOCUMENTS

| | | | | |
|---|---|---|---|---|
| 5,043,929 A | * | 8/1991 | Kramer | G06F 17/5086 703/1 |
| 5,251,290 A | * | 10/1993 | Pabon | G06F 17/509 345/420 |
| 5,297,057 A | * | 3/1994 | Kramer | G06F 17/5086 703/7 |
| 5,410,496 A | * | 4/1995 | Bolon | G06F 17/509 703/7 |
| 5,452,238 A | * | 9/1995 | Kramer | G06F 17/5086 703/1 |
| 5,835,693 A | * | 11/1998 | Lynch | G06F 17/5086 345/473 |

OTHER PUBLICATIONS

Joan-Arinyo, R., et al. "Revisiting Decomposition Analysis of Geometric Constraint Graphs" Computer-Aided Design, vol. 36, pp. 123-140 (2004).*
Hoffman, Christoph M., et al. "Making Constraint Solvers More Usable: Overconstraint Problem" Computer-Aided Design, vol. 36, pp. 377-399 (2004).*
Konkar, R. & Cutkosky, M. "Incremental Kinematic Analysis of Mechanisms" J. Mechanical Design, vol. 117, pp. 589-596 (1995).*
Gogu, Grigore "Mobility of Mechanisms: A Critical Review" Mechanism & Machine Theory, vol. 40, pp. 1068-1097 (2005).*

(Continued)

*Primary Examiner* — David Silver
*Assistant Examiner* — Jay B Hann
(74) *Attorney, Agent, or Firm* — Gates & Cooper LLP

(57) ABSTRACT

A method, apparatus, system, article of manufacture, and computer program product provide the ability to utilize a degree of freedom (DOF) for a construction. In a preparation phase, a graph structure is constructed from a construction model that transforms construction primitives into graph primitives. In a search phase, all compact sub-graphs of the graph structure are identified. In a counting phase, a DOF is calculated for each compact sub-graph and adjusted based on interactions between the compact sub-graphs. In an internal DOF searching phase, an internal DOF is computed for each compact sub-graph and used to determine and solve overconstrained sub-graphs. A determination regarding whether a structure of the construction model can be modified based on the DOF and internal DOF is output.

20 Claims, 19 Drawing Sheets

(56) References Cited

OTHER PUBLICATIONS

Fudos, Ioannis & Hoffman, Christoph M. "A Graph-Constructive Approach to Solving Systems of Geometric Constraints" ACM Transactions on Graphics, vol. 16, No. 2, pp. 179-216 (1997).*

Zou, H.L. & Lee, Y.T. "Detecting Minimum Over-Constrained Subgraphs in 2D and 3D Based on Degree of Freedom Analysis" Computer-Aided Design & Applications, vol. 2, Nos. 1-4, pp. 393-402 (2005).*

* cited by examiner

TABLE 1

TABLE 1 (CONT'D.)

| RULE # | SUPPORT(S) | | FREEDOM DECREMENT |
|---|---|---|---|
| I. | GROUNDED | | 3 |
| II. | FIXED | | 2 |
| III. | SLIDING | | 1 |
| IV. | 2 (OR MORE) SLIDING WITH SAME DIRECTION | | 2 |
| V. | 3 SLIDING, 2 HAVE SAME DIRECTION | | 2 |

TABLE 2

*FIG. 29*

GRAPH BASED DEGREE OF FREEDOM COUNTER FOR TWO DIMENSIONAL DRAWINGS

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 61/592,960, filed on Jan. 31, 2012, by Michal Hrcka and Lance Wilson Grow, entitled "Graph Based Degree of Freedom Counter for Two Dimensional Drawings."

This application is related to the following and commonly-assigned patent applications, which applications are incorporated by reference herein:

U.S. patent application Ser. No. 13/755,866, filed on the same date herewith, now U.S. Pat. No. 9,092,909, issued on Jul. 28, 2015 entitled "MATCHING A SYSTEM CALCULATION SCALE TO A PHYSICAL OBJECT SCALE", by Michal Hrcka, Lance Grow, and David Obergries, which application claims priority to U.S. Provisional Patent Application Ser. No. 61/592,972, filed on Jan. 31, 2012, entitled "MATCHING A SYSTEM CALCULATION SCALE TO A PHYSICAL OBJECT SCALE", by Michal Hrcka, Lance Grow, and David Obergries; and U.S. patent application Ser. No. 13/755,833, filed on the same date herewith, published as U.S. Publication No. 2013/0197883, on Aug. 1, 2013, entitled "CREATING A SYSTEM EQUILIBRIUM VIA UNKNOWN FORCE(S)", by Lance Grow, Zdenek Slavik, and Jirka Stejskal, et. al., which application claims priority to U.S. Provisional Patent Application Ser. No. 61/592,977, filed on Jan. 31, 2012, entitled "CREATING A SYSTEM EQUILIBRIUM VIA UNKNOWN FORCE(S)", by Lance Grow, Zdenek Slavik, and Jirka Stejskal.

BACKGROUND OF THE INVENTION

1. Field of the Invention

The present invention relates generally to mechanical and civil engineering, and in particular, to a method, apparatus, and article of manufacture for determining whether a construction can change its structure or not.

2. Description of the Related Art

In mechanical and civil engineering, determinations are often made regarding whether a structure is stable or not. To make such a determination, one needs to identify all of the structures in a construction that are fixed and those that are not fixed. In the past, to determine whether an entire construction was stable, the total number of construction/element nodes in a construction were counted and based on such a count, a determination was made. Further, some prior art systems attempted to experiment with a construction by pushing the construction to determine whether the construction moves (i.e., to determine its stability). Such prior art problems may be better understood with a brief explanation of computer drawing approaches in the construction industry.

In mechanical and civil engineering, there is a well-known problem referred to as DOF (degree of freedom). The problem consists of finding whether the construction can change its structure or not. In civil engineering a construction may be a bridge, a building skeleton, an antenna, etc. In mechanical engineering the construction may be machine elements such as excavators, car parts, etc. The DOF is one number that says what the possible moves of the construction are. In two dimensions (2D), the DOF can be a maximum of three. The three possible moves are: (1) an X direction move; (2) a Y direction move; and (3) a rotation. All of these three possible moves are present when the DOF equals three.

If the DOF is two there are only two possible moves present. If the DOF equals one it's just one possible move. The DOF may be also less than zero. A DOF value that is less than zero means that construction is over constrained.

A construction consists of components, joints of various types and supports that connect the construction to the frame. The problem is determining whether such a construction is stable or not using the DOF. As described above, in the prior art, attempts are made to move a construction and based on such movement, the DOF of the whole construction may be counted. However, the exact DOF for each construction element is not determined.

SUMMARY OF THE INVENTION

One or more embodiments overcome the problems of the prior art using a degree of freedom counter. The goal of the DOF counter is to count the overall DOF for a construction as well as the DOF for each component in the construction. Moreover, the DOF counter may also be used to identify the reason for an over constrained construction.

BRIEF DESCRIPTION OF THE DRAWINGS

Referring now to the drawings in which like reference numbers represent corresponding parts throughout:

FIG. 29 illustrates Table 2 consisting of how supports decrease the DOF of one component in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention utilize a graph structure to simulate constructions. In this regard, a unique mapping from construction into the graph is utilized. Such a graph does not contain edges that have more than two vertices. Further, weldings may be mapped into the graph using special edge connections. In addition, a compact sub graph may be used as the base for performing the count operation. Once the graphs are created, the various parts (e.g., the graph edges and vertices) of the graphs are labeled. A DOF counter is then used to count the exact DOF number for each component that the construction contains (i.e., each graph edge). Prior art methods cannot count the DOF number for each construction element. Each edge has a construction representation so it can be mapped onto the real construction. Accordingly, an existing DOF is spread to a graph and using the graph, over constrained edges (construction elements) may be identified. In this regard, elements that are redundant can be identified and removed from construction (a feature that is useful during construction design that does not require a manual check as embodiments of the invention can automatically, without additional user interaction, provide such a removal).

Hardware Environment

Figure 1:
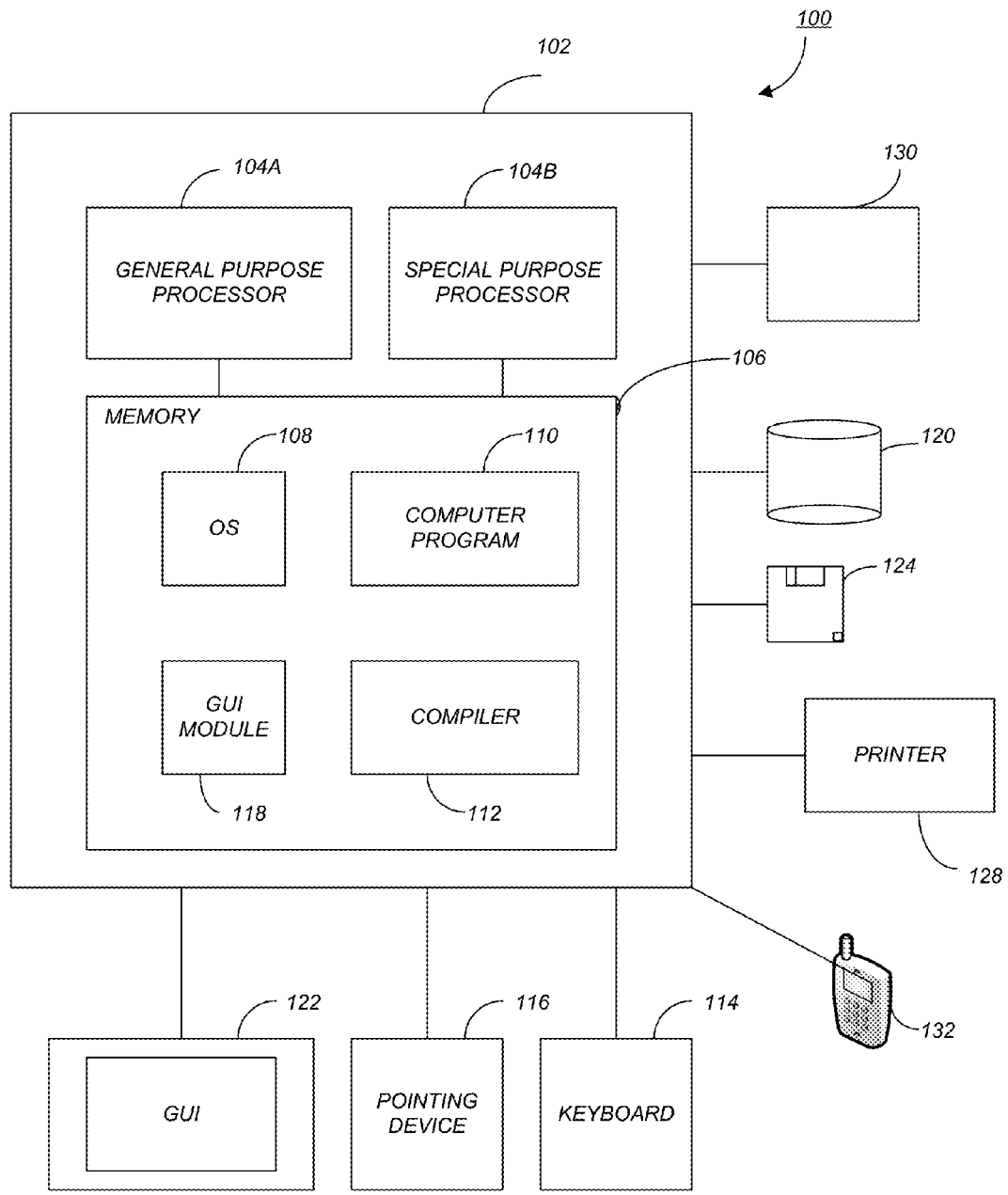
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to integrated with other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to or may comprise a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
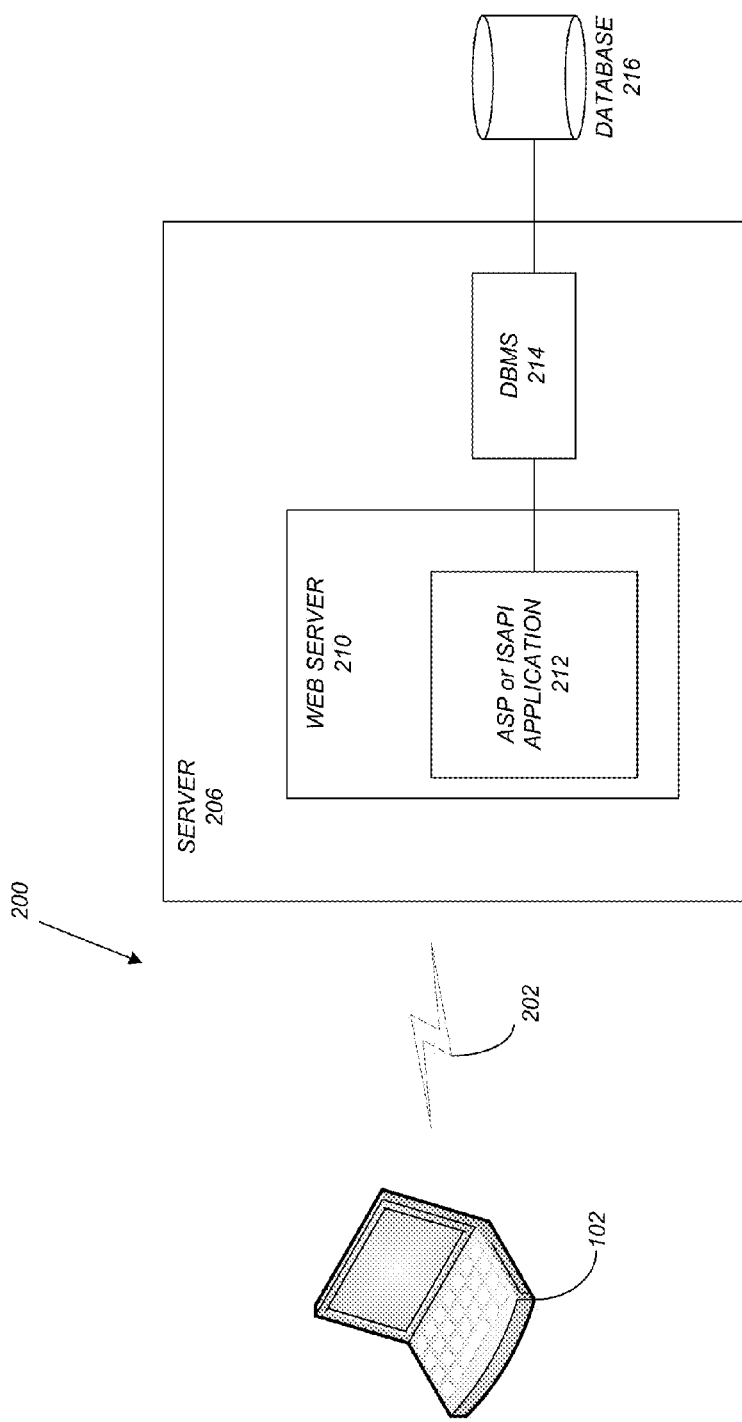
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, multi-touch devices, and/or any other device with suitable processing, communication, and input/output capability.

Of course, those skilled in the art will recognize that any combination of the above components, or any number of different components, peripherals, and other devices, may be used with computers 102 and 206.

Embodiments of the invention are implemented as a software application on a client 102 or server computer 206. Further, as described above, the client 102 or server computer 206 may comprise a thin client device or a portable device that has a multi-touch-based display.

Construction

Embodiments of the invention utilize and work with a construction. Such a construction is created/obtained by the user (e.g., by drawing a representation of a design in a computer drawing application). As described herein, a construction consists of three major parts: (1) beams; (2) joints; and (3) supports. The first part, beams, are connected together with the second part—joints. Construction that consists of beams and joints is connected to a frame by supports. A frame is a part of construction that is often neglected. It can be neglected because of a few reasons: it's independent of the construction or it's too complex to be solved together, etc.

The three major types of parts can be divided into specialized parts. These specializations allow engineers to construct various types of constructions.

Beam

Figure 3:
FIG. 3 illustrates an exemplary beam in accordance with one or more embodiments of the invention.

A beam is the simplest part of construction. A beam is an edge connecting two joints. It can connect any type of joints. Just joints can be connected with a beam. A beam has to connect just two joints. Both joints have to be different—a beam can't connect a single joint with itself. FIG. 3 illustrates an exemplary beam 300 that connects two joints A and B in accordance with one or more embodiments of the invention.

Joints

A joint is part of construction that is placed on both ends of a beam 300 (e.g., joints A and B). There are three types of joints that may be used as described herein. A normal joint is the basic joint. Welded and crossing joints extend the normal joint.

Normal Joints

Figure 4:
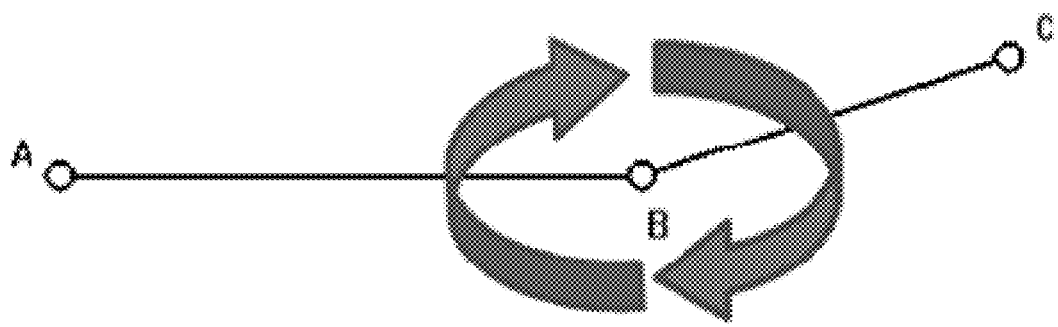
FIG. 4 illustrates a normal joint with arrows indicating the possible rotation around normal joint B in accordance with one or more embodiments of the invention.

When two beams 300 are connected together in one joint and the joint is a normal joint, both beams 300 can rotate around the normal joint. FIG. 4 illustrates a normal joint with arrows indicating the possible rotation around normal joint B.

Welded Joints

Figure 5:
FIG. 5 illustrates a welded joint B in accordance with one or more embodiments of the invention.

A welded joint has meaning only if there is more than one beam 300 connected by the welded joint. In such a case, there is no beam 300 rotation allowed around that welded joint. FIG. 5 illustrates a welded joint B in accordance with one or more embodiments of the invention. As illustrated, no rotation is possible around welded joint B—the angles of the attached beams are fixed/welded to the joint B.

Figure 6:
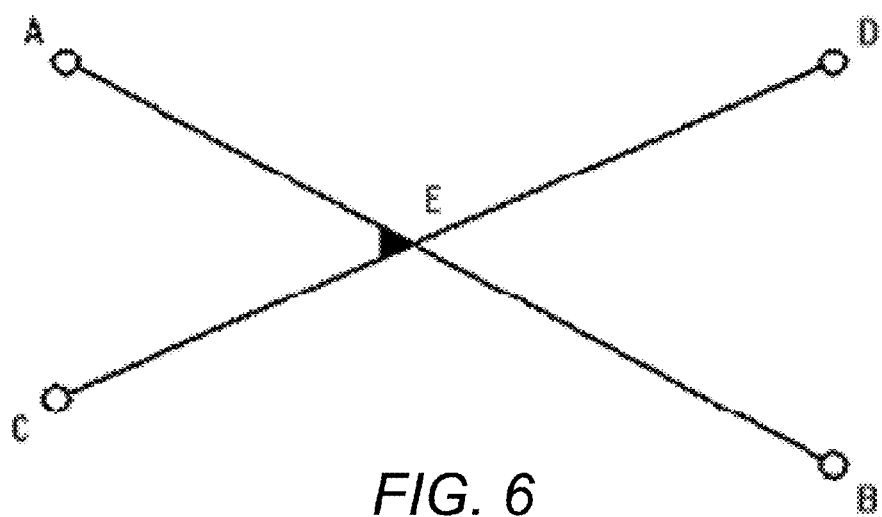
FIG. 6 illustrates a welded joint E in accordance with one or more embodiments of the invention.

Welded joints can also be created in a location where no normal joint existed before—elsewhere than on the ends of beam 300. Such a welded joint is illustrated in FIG. 6 (welded joint E). More than one beam may be joined into a single welded joint.

Crossing Joint

Figure 7:
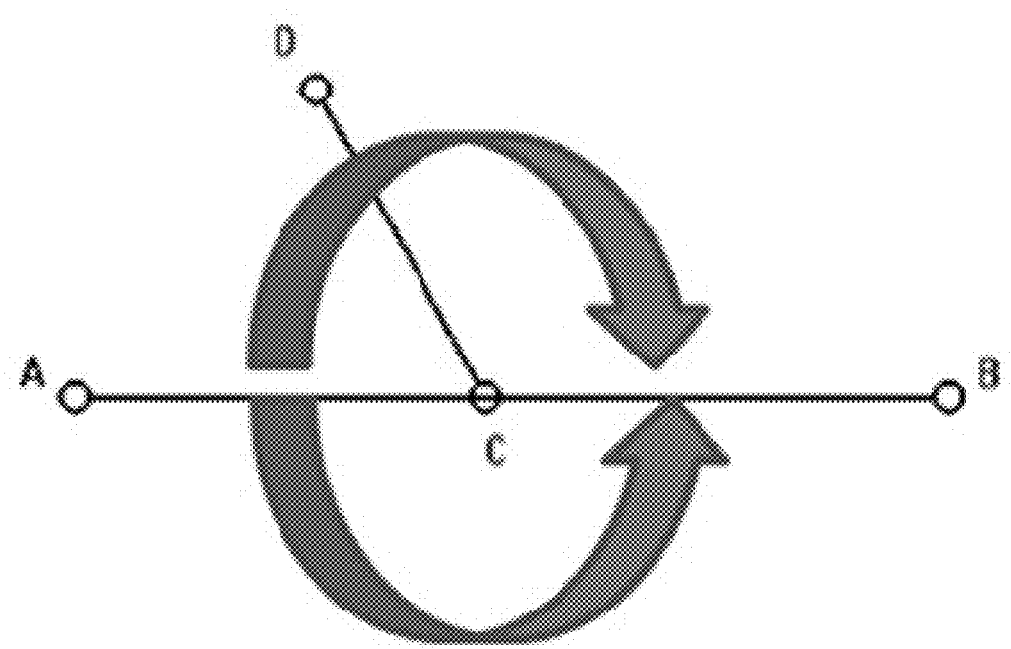
FIG. 7 illustrates an example of a cross joint in accordance with one or more embodiments of the invention.

A crossing joint allows rotation of the connected beams 300. It is an extension of a normal joint. An example of a cross joint is illustrated in FIG. 7. Beam CD can rotate around the cross joint C and the joint C is attached to compact beam AB.

Figure 8:
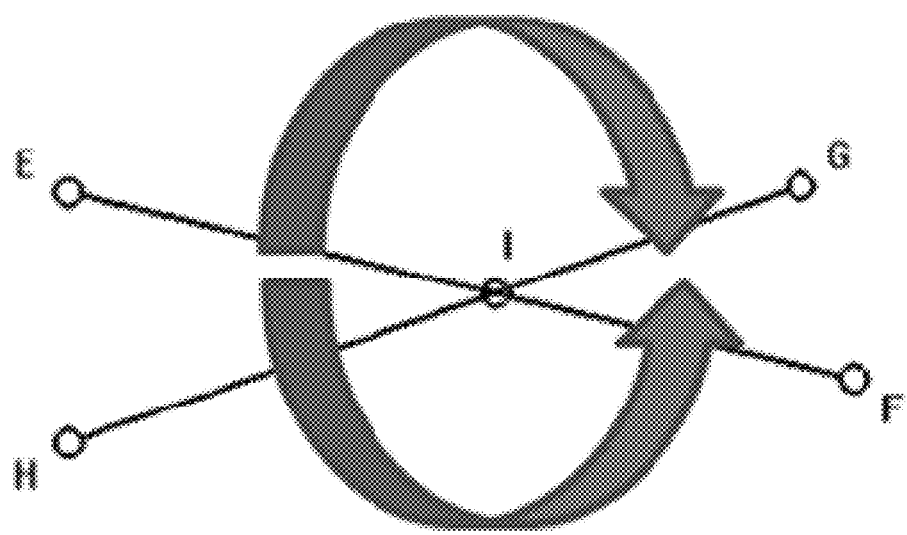
FIG. 8 illustrates a crossing joint in the middle of two beams in accordance with one or more embodiments of the invention.

It is also allowed to have a crossing joint in the middle of two beams as illustrated in FIG. 8. In FIG. 8, beams EF and HG are compact and joint I is a crossing joint for both of them. These beams (EF and HG) can rotate around the cross joint I. Note that more than two beams can be joined into one crossing joint.

Supports

Supports are parts of the construction that tie the construction to the frame. A frame as used herein means surrounding the construction. Supports can tie a frame and construction in several ways. Each way is a different support type.

Fixed Support

Figure 9:
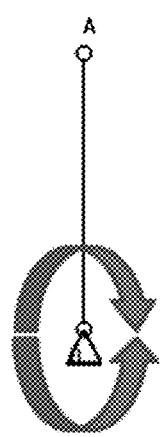
FIG. 9 illustrates the only allowed move, rotation, of a beam connected to a frame in accordance with one or more embodiments of the invention.

Beams connected to a fixed support have just one degree of freedom. For a fixed pin, this freedom is rotation. The only allowed move of a beam connected to the frame is rotation as illustrated in FIG. 9. As illustrated in FIG. 9, a support is indicated by a triangle. The arrows indicate that the beam AB can rotate around the joint and the fixed pin/support at B.

Sliding Support

Figure 10:
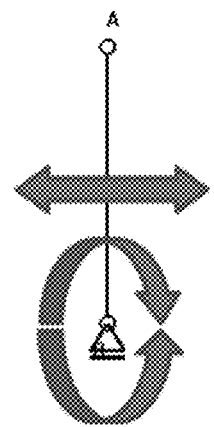
FIG. 10 illustrates the allowed moves based on the two degrees of freedom associated with sliding support/pin at B in accordance with one or more embodiments of the invention.

Beams connected to a sliding pin/support have two degrees of freedom. Beams can rotate (as fixed pin—$1^{st}$ degree of freedom) and beams can move in one direction ($2^{nd}$ degree of freedom). The direction of move is given by the support orientation. FIG. 10 illustrates the allowed moves based on the two degrees of freedom associated with sliding support/pin at B. The beam AB can move sideways (left/right) as well as rotate around sliding pin at B. To indicate a sliding pin, a line may be drawn under a rectangle as illustrated in FIG. 10.

Grounded Support

Figure 11:
FIG. 11 illustrates a schematic picture of a grounded support in accordance with one or more embodiments of the invention.

A grounded support is the most restrictive support. The beams connected to a grounded support have no degrees of freedom. In other words—the beams cannot move. FIG. 11 illustrates a schematic picture of a grounded support in accordance with one or more embodiments of the invention. The grounded support is illustrated with slanted lines under the joint.

Example of Complex Construction

Figure 12:
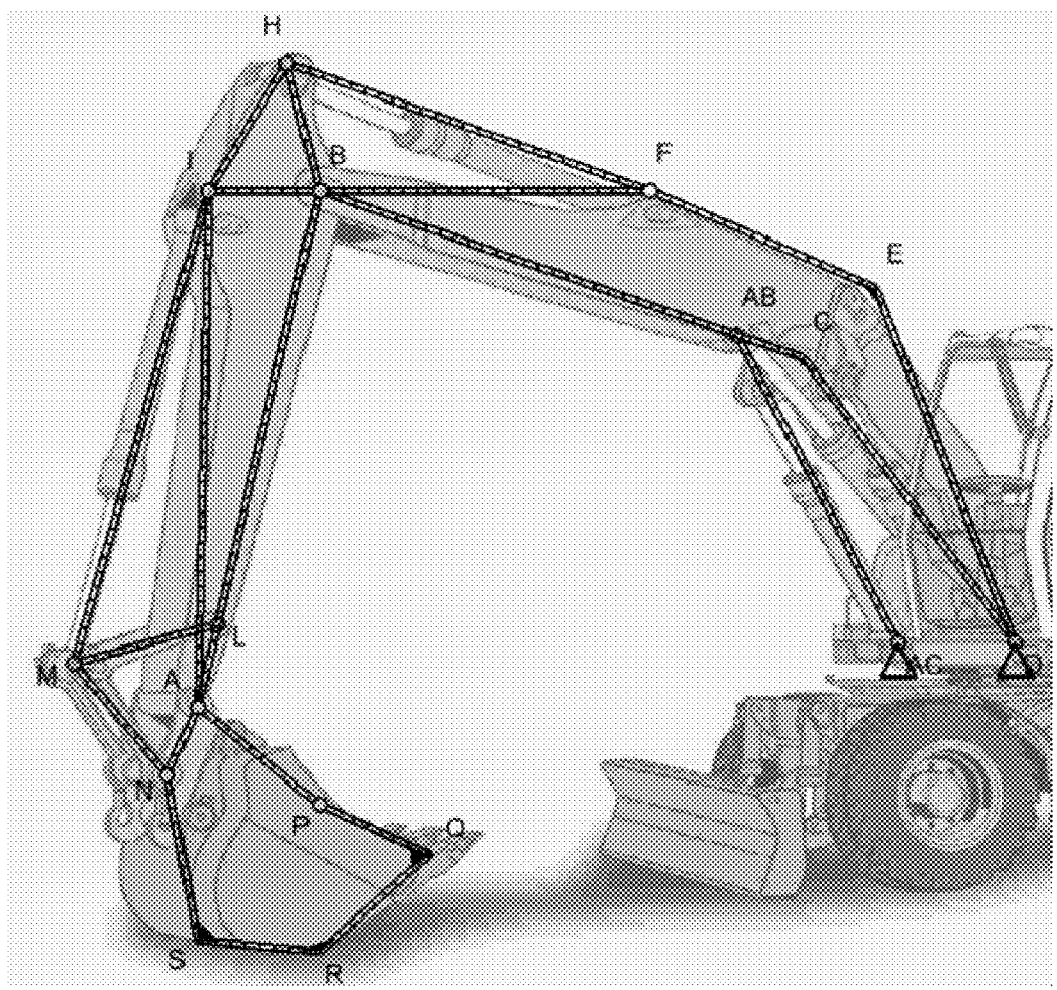
FIG. 12 illustrates an example complex construction utilizing some construction components (not including sliding and grounded supports) in accordance with one or more embodiments of the invention.

FIG. 12 illustrates an example complex construction utilizing some of the above described construction components (not including sliding and grounded supports). Each letter indicates a join and beams connect the joints. Fixed supports are illustrated at AC and D.

Solution—Computing DOF

The method for computing the DOF, in accordance with embodiments of the invention, has four (4) main phases: (1) the preparation phase; (2) the searching phase; (3) the counting phase; and (4) the internal DOF counting phase. In the preparation phase, a graph structure is constructed from a construction model. In the searching phase, all compact sub graphs are found/identified. In the counting phase, the compact sub graphs interact with each other and the overall DOF is found. In the last phase (internal DOF search), internal over constrained compact sub graphs are found.

Preparation Phase

Figure 28A:
FIGS. 28A and 28B illustrate Table 1 consisting of the mapping/transformation from a construction component to a corresponding graph representation in accordance with one or more embodiments of the invention.
Figure 28B:
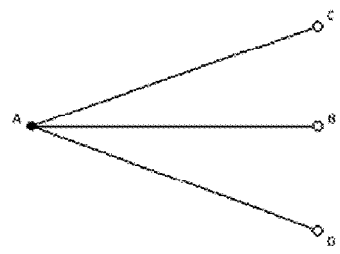

This phase is a primary component for computing the DOF. In the preparation phase, construction primitives are transformed into graph primitives. Such a preparation enables the DOF computation to use just graph operation to calculate the DOF. The key here is to only use graph operations with complicated constructions that contain welded joints and fixed crossing joints. Table 1 (contained in FIGS. 28A and 28B) illustrates the mapping/transformation from a construction component to a corresponding graph representation. For example, in Table 1, a beam is transformed into an edge in a graph representation and joints become vertices of the graph.

A fixed crossing joint becomes a triangle with an edge (row fixed crossing joint I.). The situation is very similar in case of a fixed crossing joint II.—For more fixed crossing joints on one beam, there is new triangle for each fixed crossing joint. A fixed crossing joint that is on two crossing beams is transformed into two triangles (each arising on one beam) that are connected together through the fixed crossing joint (see row fixed crossing joint III.).

A welded joint has two forms. The first welded joint form is when the beams are welded in one (ending or starting) joint (see Table 1 row Welded Joint I). All beams (edges) are connected into triangles. When a welded joint is in the middle of beams, it is transformed into a crossed rectangle where two sides of the rectangle are edges (beams) that are welded (see row Welded Joint II. in Table 1). A more complex situation arises when both cases are together in one weld. Such a complex case is shown as Welded Joint III in Table 1.

Figure 13:
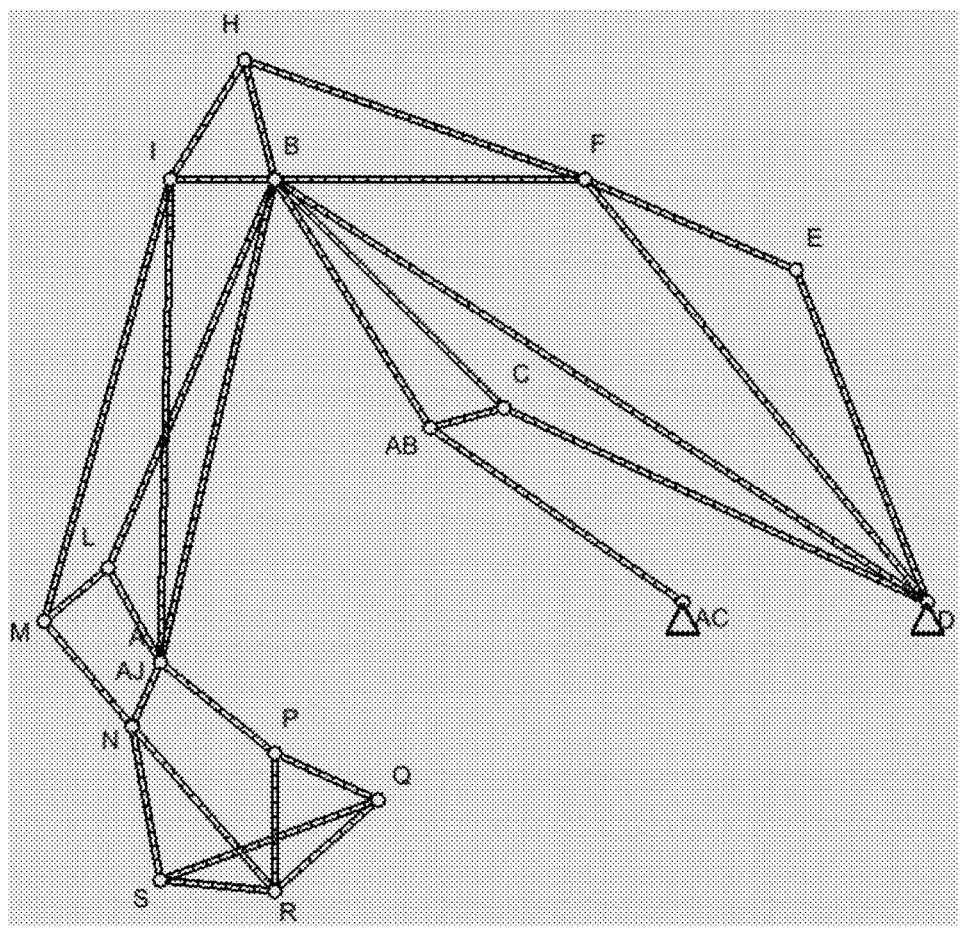
FIG. 13 illustrates an exemplary graph representation of a complex construction example (from FIG. 12) in accordance with one or more embodiments of the invention.

Application of Table 1 to the construction from FIG. 12 results in the graph of FIG. 13. Accordingly, FIG. 13 illustrates an exemplary graph representation of a complex construction example (from FIG. 12).

Figure 14:
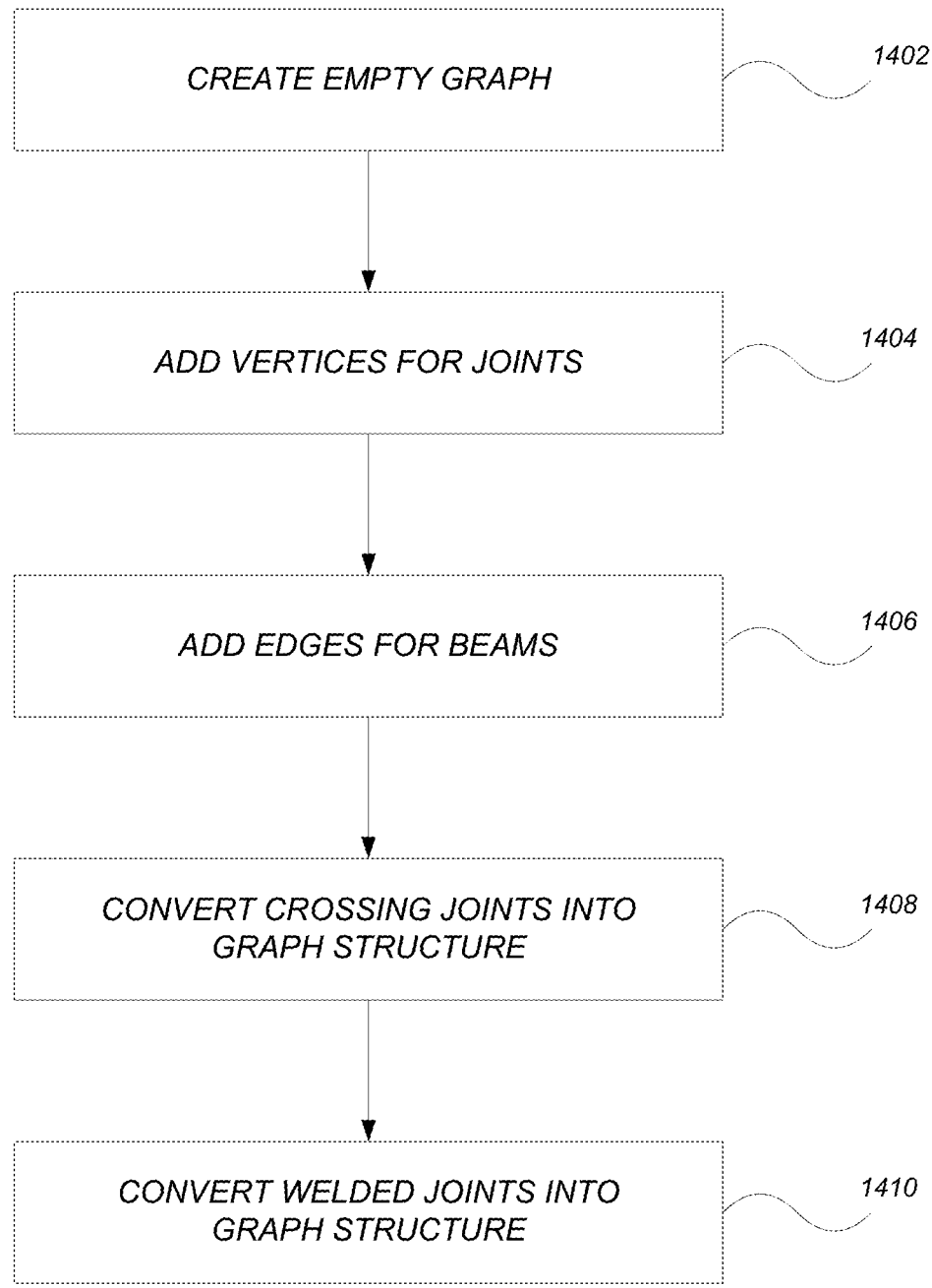
FIG. 14 illustrates the logical flow for converting a construction structure into a graph structure in accordance with one or more embodiments of the invention.

FIG. 14 illustrates the logical flow for converting a construction structure into a graph structure in accordance with one or more embodiments of the invention.

At step 1402, an empty graph is created. The empty graph structure does not contain duplicity for vertices and/or edges. In this regard, if there is adding action that adds an already existing vertex of an edge, the action does nothing.

Steps 1404-1410 traverse the construction to populate the graph structure. At step 1404, for each joint in the construction (including crossing and welded joints), a graph vertex is created (using its cords) (i.e., in the graph). Once the graph vertex is created in the graph, the vertex is actually added to the graph.

At step 1406, for each beam in the construction structure, a graph edge is created (using its vertices as ends) and the edge is added into the graph.

At step 1408, crossing joints are converted from the construction structure into the graph structure. Thus, for each crossing joint in the construction structure, corresponding crossing joints and edges may be created in the graph structure based on the mapping in Table 1. In this regard, edges are created via a rule from Table 1 and added to the graph. As an example, edges added to the graph may include: edges A-D, D-B (from Table 1, row fixed crossing joint I); edges A-C, C-B, A-E, and E-B (from Table 1, row fixed crossing joint II); and edges A-E, E-B, C-E, and E-D (from Table 1, row fixed crossing joint III).

At step 1410, welded joints are converted from the construction structure into the graph structure. Thus, for each welded joint in the construction structure, the different types of welded joints are determined and appropriate entities in the graph structure are added. For example, if the welded joint is at the end of any beam and isn't in the middle of a beam, the rule/mapping for welded joint I may be followed. In such an example, edges that connect the welded beams as in Table 1 are created and added to the graph (e.g., edges C-B, and B-D from Table 1—welded joint 1).

Similarly, if the welded joint is not at the end of a beam and is in the middle of a beam, edges are created that connect the welded beams as in Table 1, row welded joint II (and then added to the graph). Examples of edges may include edges A-C, C-B, and B-D from Table 1, row welded joint II.

Further, if the welded joint is the end joint of any beam and is in the middle of a beam, the rule from Table 1, row welded joint III may be used to create (and add to the graph) an edge that connects the welded beams. Such a rule may use the rules for welded joint I and II followed by connected graph edges under the rule for welded joint III. As an example, edges A-C, C-B, B-D, and I-H, H-F, F-G, and D-I, C-I, and C-H may all be added to the graph.

Searching Phase

After the preparation phase, the graph is ready for further analyses. Such a graph is undirected and unvalued. In addition, there is no guarantee that the graph is connected. The prepared graph is the input to the searching phase.

Figure 15:
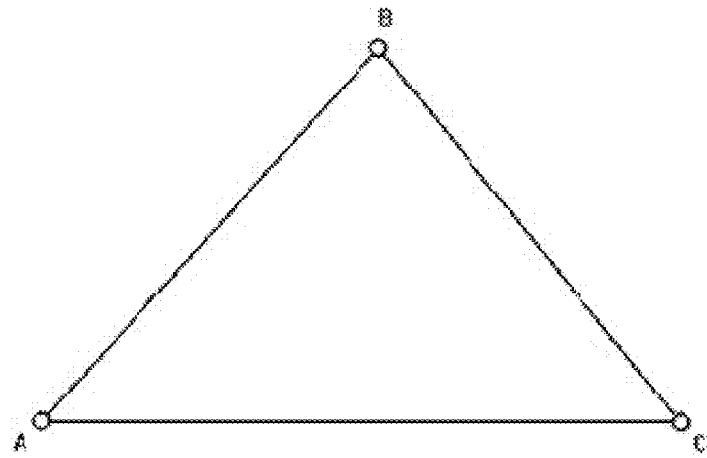
FIG. 15 illustrates a trivial compact graph in accordance with one or more embodiments of the invention.

The goal of the searching phase is to identify all compact sub graphs (also referred to as component herein) in the input graph. The compact sub graph here stands for a sub-graph that can't change the shape by any force. It may be noted that a DOF search is based on the idea that all components of a construction are ideal solid components (e.g., it is impossible to deform them). A trivial compact graph is a triangle. To enable an ideal solid component that is impossible to deform, one may utilize a triangle solid construction for which the shape cannot be changed. FIG. 15 illustrates a trivial compact graph in accordance with one or more embodiments of the invention.

Figure 16:
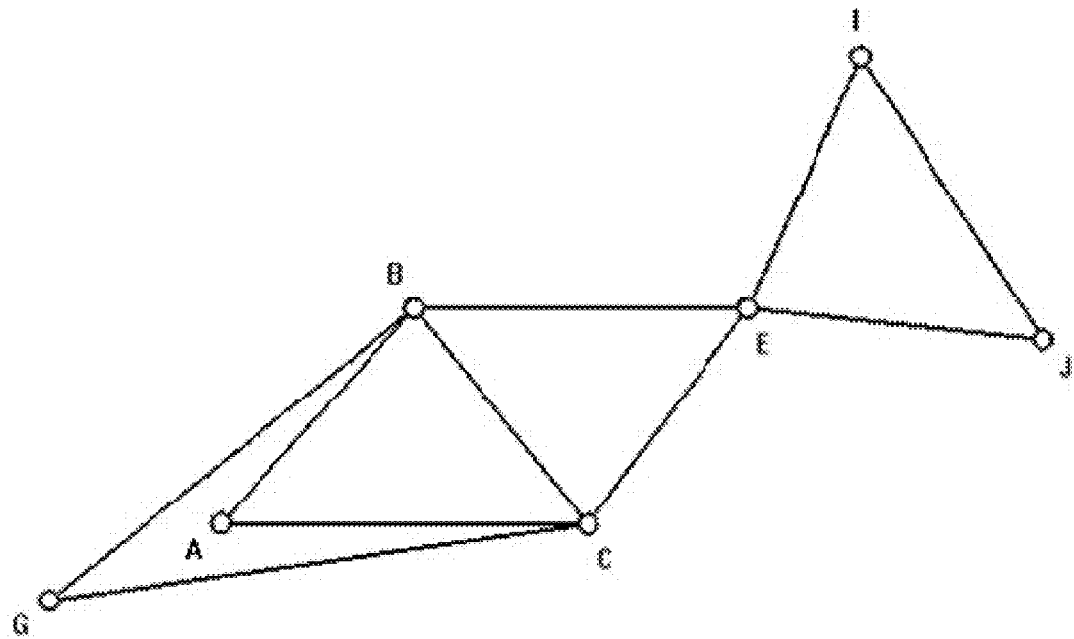
FIG. 16 illustrates an example of a compact sub graph in accordance with one or more embodiments of the invention.

More complex compact graphs may consist of additional triangles. For example, in a compact sub graph, the triangles share at least one edge. FIG. 16 illustrates an example of a compact sub graph in accordance with one or more embodiments of the invention. In FIG. 16, two compact sub graphs are illustrated—the first one is A-B-C-G-E and the second is E-I-J. As illustrated, the $2^{nd}$ compact sub graph (E-I-J) shares just vertex E with the $1^{st}$ compact sub-graph. In this regard, as used herein, a triangle rule provides that such compact graphs are two compact graphs and not a single compact graph.

Figure 17:
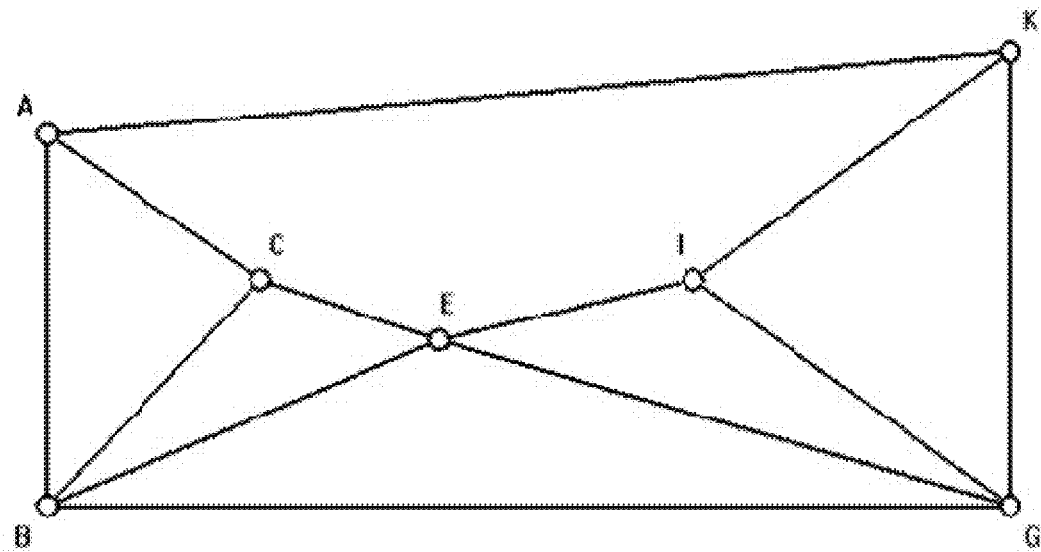
FIG. 17 illustrates a connecting edge rule used to find compact sub graphs in accordance with one or more embodiments of the invention.

Another rule in finding compact sub graphs is that if an edge connects two parts of a graph that are already part of the same compact sub graph, the edge becomes part of that sub graph as well. An example of such a rule is illustrated in FIG. 17. The compact sub graph is A-B-C-E-I-G-K (all adjacent triangles). In the compact sub graph, only edge A-K doesn't fit the rule about the triangles. However, such an edge hits the rule about the connecting edge (this one) and is therefore added to the sub graph.

The last rule that allows construct compact sub graph is the hull rule. The hull rule relates to the set of edges and vertices that surrounds the core and connects the hull to the core. A core is already found in a compact sub graph. As used herein, a core is defined as: compact subgraph that had been already found. The core can be a very simple compact subgraph like a beam (FIG. 18) or a very complex subgraph (but it needs to be compact). Examples of cores are illustrated in FIG. 19 as subgraph ABC and in FIG. 20 as subgraph ABCD. The rule provides that such a core, the hull, and the connections between the hull and the core are one compact sub graph. This rule is about the enlarging of already found compact subgraphs by adding the hull. To determine which entities to add, one may require that all vertices of the hull have to be connected to the core. This rule is the most complicated rule (especially for implementation).

Figure 18:
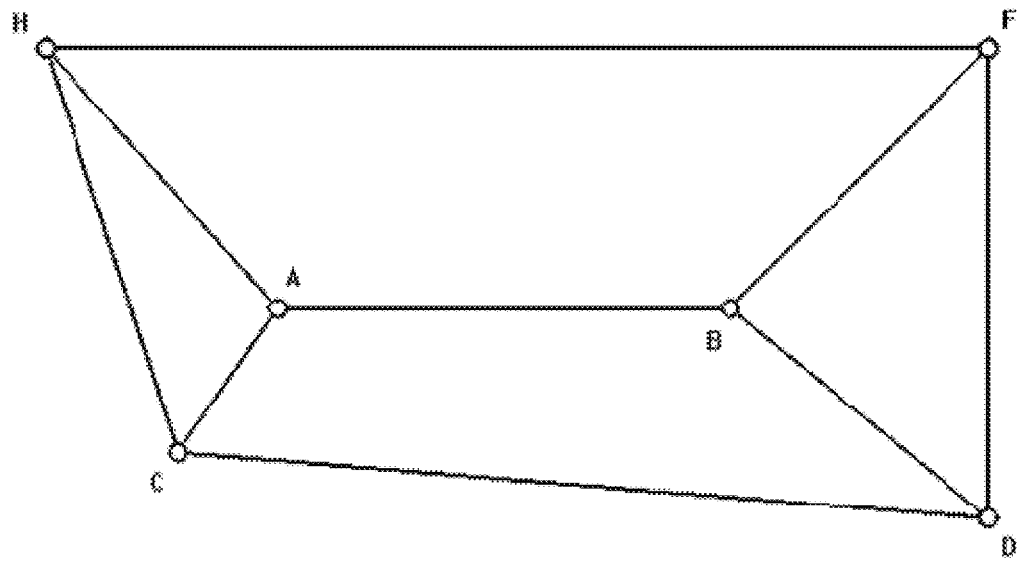
FIGS. 18-20 illustrate examples of hulls in accordance with one or more embodiments of the invention.
Figure 19:
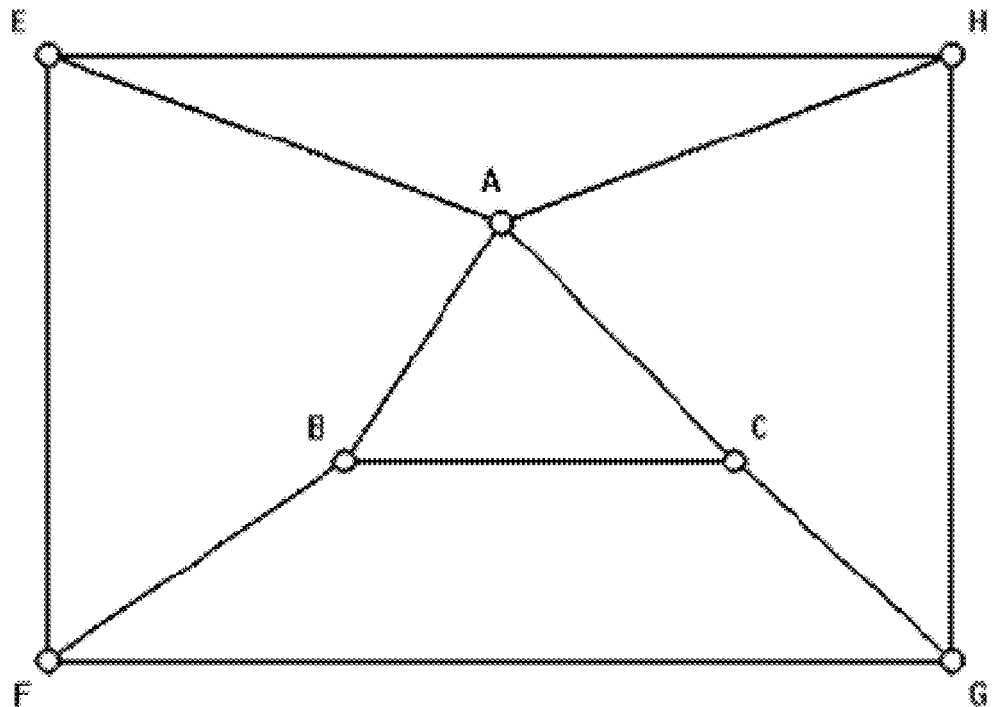
Figure 20:
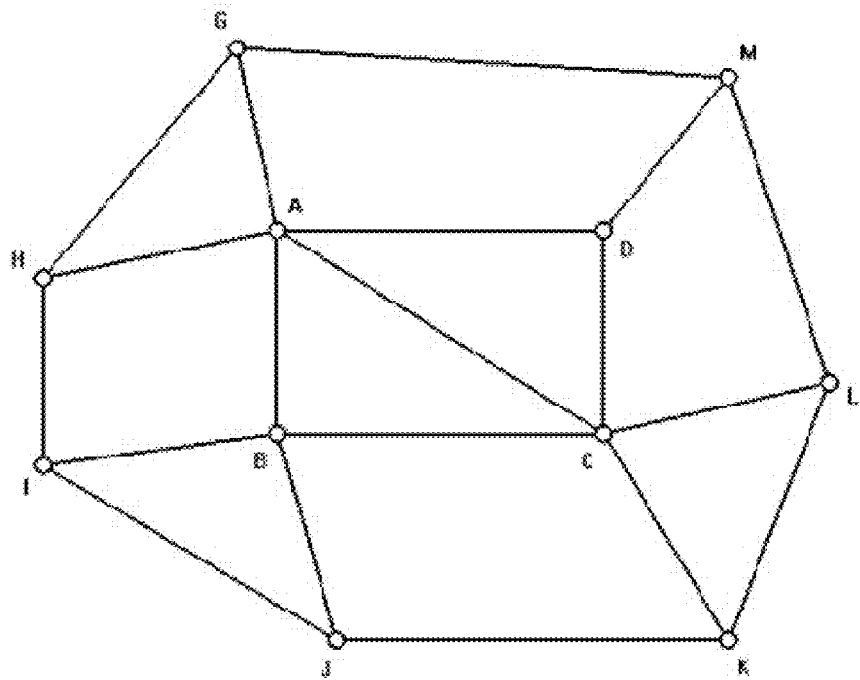

FIGS. 18-20 illustrate examples of hulls in accordance with one or more embodiments of the invention. In FIG. 18, the hull is for one edge and the core is AB. In FIG. 19, the hull is for a triangle (core is ABC). In FIG. 20, the hull is for a rectangle (core is ABCD). As illustrated, the shape of the hull is independent from the core shape. The rule is that all vertices of a hull have to be connected to the core. Vertices on the core that connect the hull have to be for one edge core and at least two different vertices. Accordingly, for a triangle core, at least three different vertices must connect the hull, and for all more complex cores, at least three different vertices.

Figure 21:
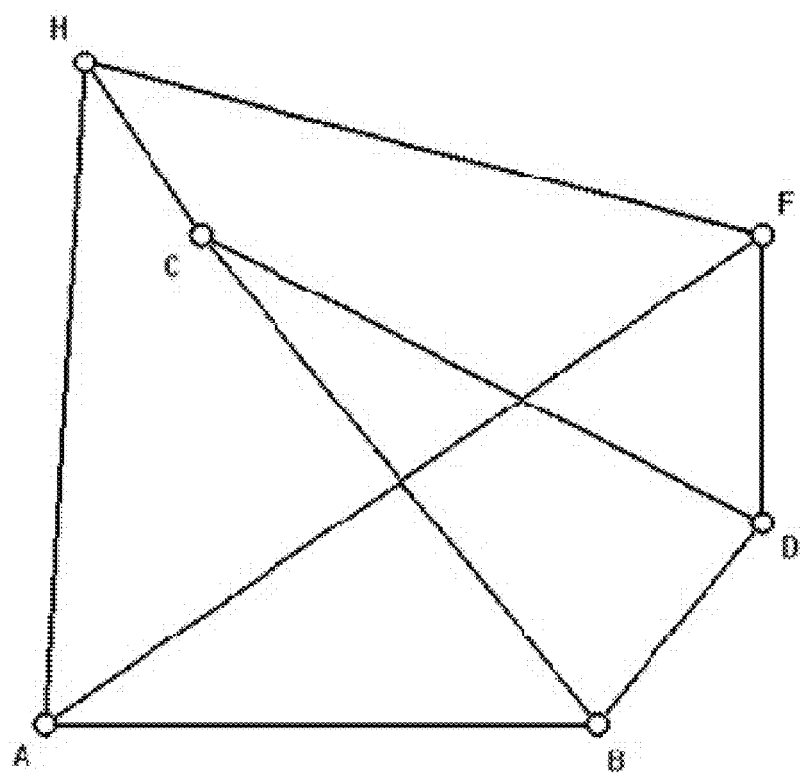
FIG. 21 illustrates the hull for an edge in accordance with one or more embodiments of the invention.

It may be noted that the hull doesn't need to be surrounding the core. In the graph perspective everything is about the topology. It is about the relation (connections) between vertices. In this regard, the hull for an edge AB can look like that illustrated in FIG. 21 (the same hull as in FIG. 18). Such logic can be applied to any kind of hull for any kind of core.

Complex Construction Divided into Compact Sub-Graphs

Figure 22:
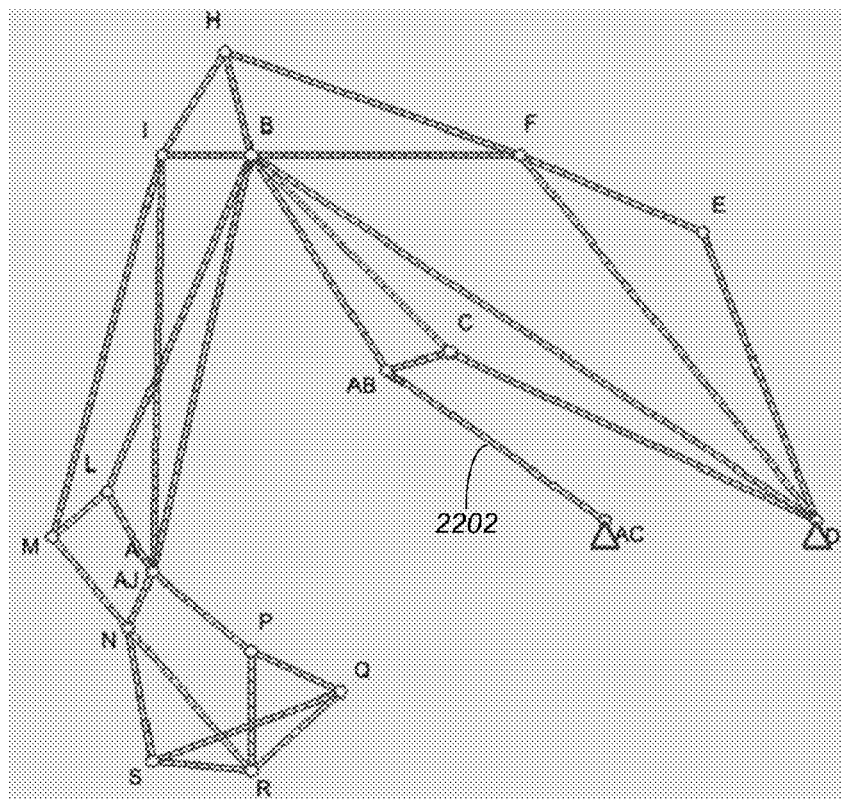
FIG. 22 illustrates two compact components in an graph representation of a complex example of FIG. 13 in accordance with one or more embodiments of the invention.

In FIG. 22, there are two compact components—the second is that of AB-AC 2202 and the first is all of the remaining edges and vertices. The first has been calculated using the triangle and hull rule. The second sub graph 2202 doesn't hit any of the three rules—so it's compact sub graph by its own.

Counting Phase

After the preparation and searching phase is the counting phase. This phase is the phase where the DOF number is calculated. All previous phases were in preparation for this phase. The counting phase has two steps. In the first step, the DOF is calculated for each compact sub graph. In the second phase, the DOF is computed for all compact components/sub-graphs that interact with each other. In other words, a DOF for each compact sub graph is first computed (e.g., each compact sub graph can have 1, 2, or 0), thereafter, the interactions between the compact sub graphs are determined.

Counting the DOF for compact components like it is independent starts by setting the component default DOF (which is three). It may be assumed that at the beginning, each component is fully free (has default DOF). Construction elements that decrease the freedom of compact sub graph are supports. Table 2 illustrated in FIG. 29, demonstrates how supports decrease the DOF of one component.

Once the component contains at least one support, the component has a lower DOF than the default setting (i.e., of 3). If the component contains one fixed support and one grounded support, its DOF is decreased by 2 and 3 (2 for fixed and 3 for grounded support). The resulting DOF for such a component is −2 (i.e., the default setting of 3-5).

One may note that Rule V. in Table 2 is a conclusion of the previous rules III. and IV.

Figure 23:
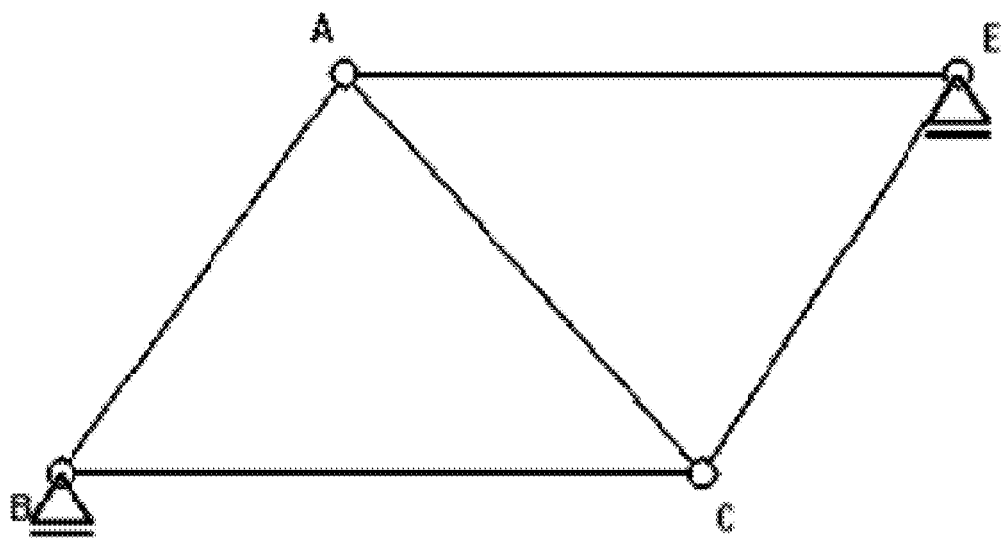
FIGS. 23-25 illustrate some additional examples of using the DOF decrement rules in accordance with one or more embodiments of the invention.
Figure 24:
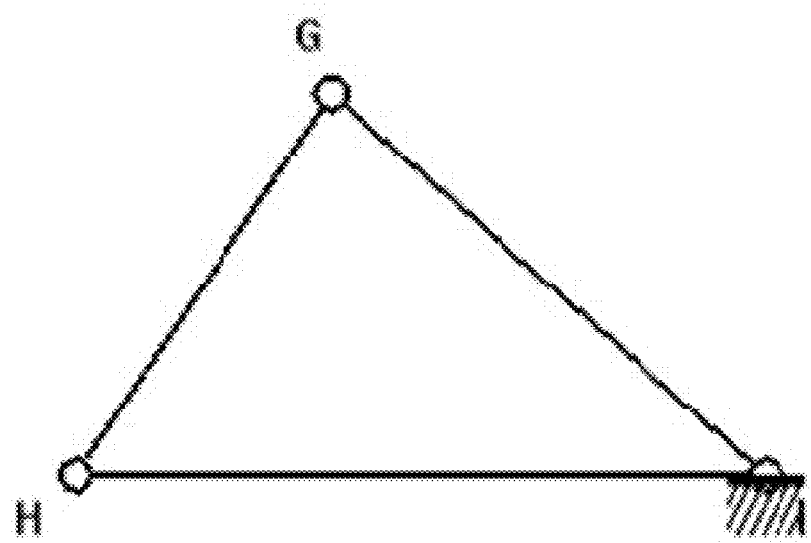
Figure 25:
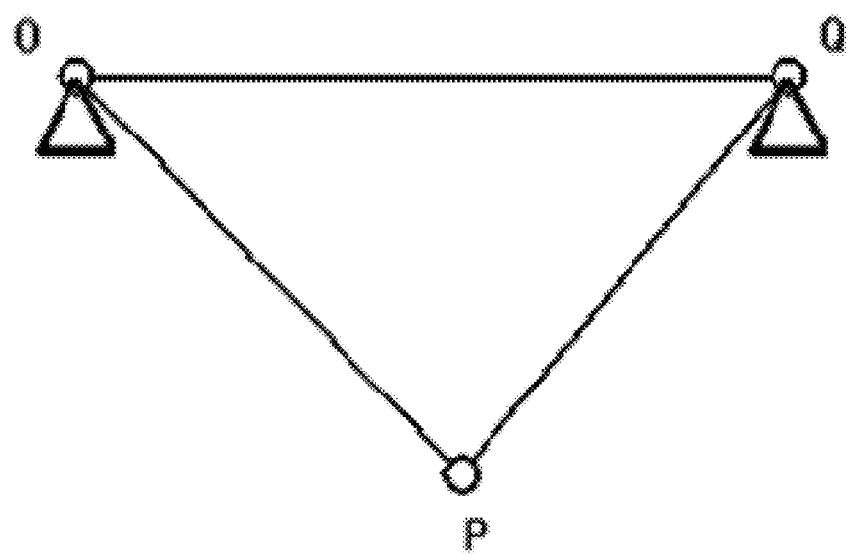

FIGS. 23-25 illustrate some additional examples of using the DOF decrement rules. In FIG. 23, the resulting DOF is 1 (i.e., 3-1-1 [for the 2 sliding supports based on Rule III). In FIG. 24, the resulting DOF is 0 (3-3 for the grounded support under rule I). In FIG. 25, the resulting DOF is −1 (3-2-2 for the two fixed supports under rule II).

Once each component that has a support is marked by its DOF, the process can continue. The main idea of following a discreet set of steps is to spread the lock of each component. If a component has less than two degrees of freedom it can somehow lock its neighbors (or it can decrease the ability of its neighbors to move). Table 3 shows how locks numbers can be applied to the neighbors when components have particular DOFs. The locking number means how many degrees of freedom can be decreased from the neighbors of the component.

TABLE 3

| Rule # | Component DOF | Locking number |
|---|---|---|
| I. | >2 | 0 |
|    | 2 |   |

TABLE 3-continued

| Rule # | Component DOF | Locking number |
|---|---|---|
| II. | 1 | 1 |
| III. | 0 | 2 |
|    | <0 |   |

The key here is that the simple decreasing of the DOF for neighbors of each component may cause an infinite loop of decreasing. To avoid the infinite loop, one must understand that components are connected with vertices. The border vertices are the gates that will count the number of passed locks (at the beginning it's equal to zero). If the locking number minus the passed locks is more than zero (0), then the vertex is able to pass the lock. The DOF decreasing process ends when there is no possibility to share any lock. An example of the process of spreading locks is illustrated in FIG. 26.

Figure 26:
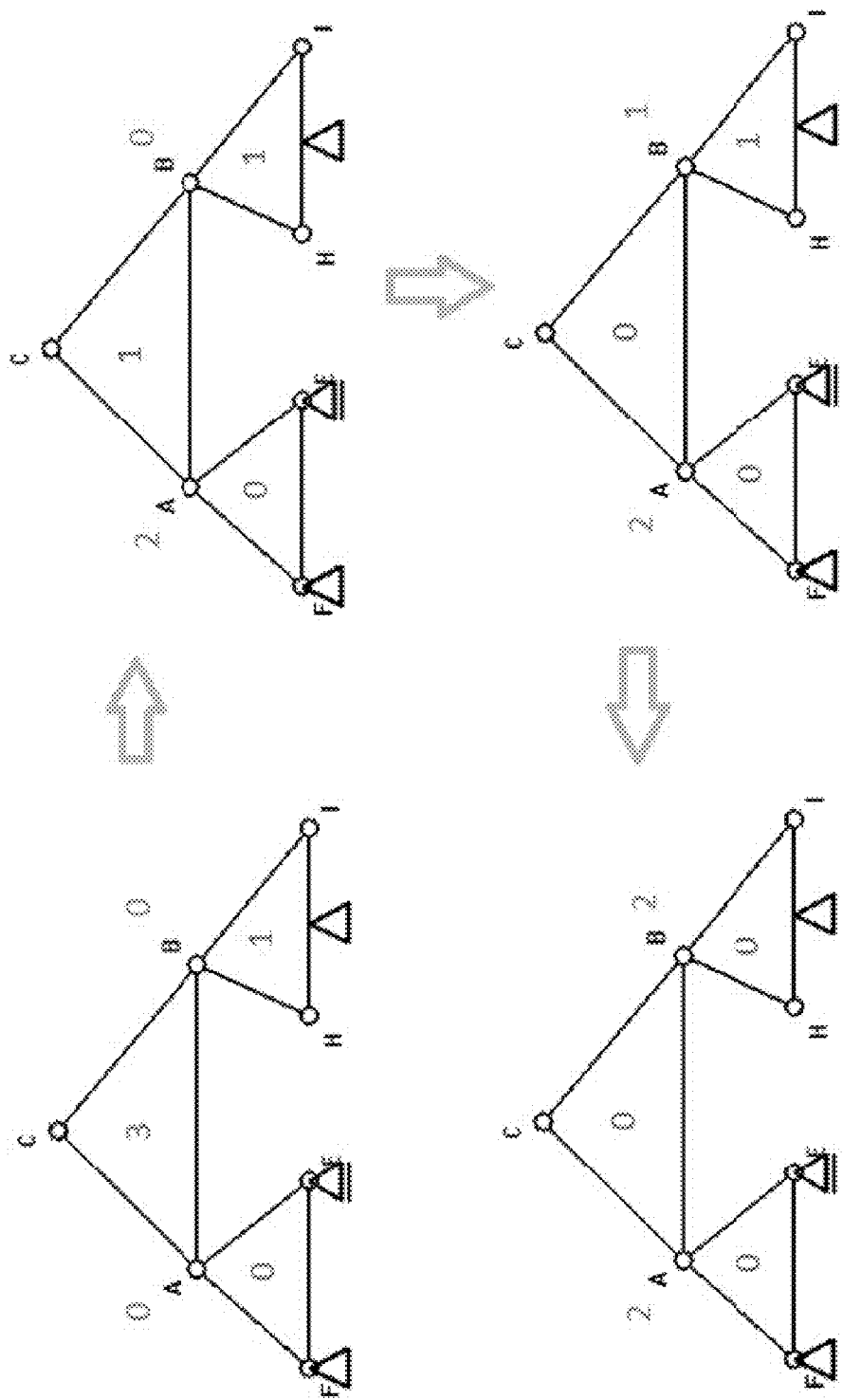
FIG. 26 illustrates an example of the process of spreading locks in accordance with one or more embodiments of the invention.

As illustrated in FIG. 26, there are four steps for spreading the locks. The first step (left top) shows the component DOF after initialization. As can be seen, the AEF component has a DOF equal to zero, the ABC component has a DOF equal to three, and the BIH component has a DOF equal to one (these numbers came from the previous phase). Each border vertex has a default passed number (zero).

In the second step (right top), the AEF component is passed two (2) locks from the ABC component through vertex A. After the transfer, the new DOF of ABC is 1 and the passed number for vertex A is 2.

In next step (right bottom) component BIH is passed 1 lock from component ABC through vertex B. Afterwards, ABC has a DOF of 0 and B has a passed number of 1. Based on Table 3 (Rule III.), the locking number for component ABC is 2 (i.e., in the lower right corner, the DOF is zero). Accordingly, the ABC component can pass 2 locks. There are two (2) borders—A and B. Border A has a passed number of 2 and the locking number of component ABC is 2 (i.e., based on Rule III.). The gap between these two numbers is zero. Therefore, component ABC can't pass any lock via vertex A. A different situation is on border B. At border B, the passed number is 1 and the locking number of ABC is 2. The gap between these two numbers is 1. According to the locking number table (i.e., Table 3, Rule II.), the DOF of the BIH component may be decreased by one and the passed number on vertex B may be increased. Such a transfer is illustrated in the last step (bottom left). Thereafter, no more moves are possible and the locks are spread. In this regard, the process for spreading the locks is repeated for each compact subgraph and components therein until there is no change in the DOF (at which point the spreading is complete).

Once complete, the DOF for the individual component elements is the same as the compact subgraph that the element is part of/associated with.

Internal DOF Search Phase

There are two types of degrees of freedom for construction. One type is the DOF against the frame. The second type is internal DOF. Internal DOF can be computed for each compact sub graph. The internal DOF number determines whether the component is over constrained (i.e., whether it is fixed or not). If the internal DOF is equal to 0, then the compact sub graph is fixed. As described above, if it is less than zero, it is over constrained. The internal DOF is calculated by the following simple equation.

$$InternalDOF = 2*VertexCount - EdgeCount - 3$$

If a triangle contains a welded joint, it must be counted in the equation as an additional edge. This is necessary to identify internal over constrained additional welded compact components.

Once a component is found that is over constrained, a search may be conducted for suspicious edges that could cause the over constraining Such a search may be performed by iterating over the edges of particular compact sub graphs. Each iteration removes one edge. If such a sub graph is still a compact sub graph (after removing one edge), then the edge can be added to the list of suspicious edges. After all edges from a sub graph are processed, we have a list of removable edges.

It may further be noted that internal over constrained systems can be solved several ways. The list of removable edges contains all possible combinations. It means that removing one edge from the compact sub graph can produce a result that the sub graph is no longer over constrained—not necessary all edges from the list needs to be removed. Once a removable edge is identified, embodiments of the invention may remove such an edge from the sub graph.

Logical Flow

Figure 27:
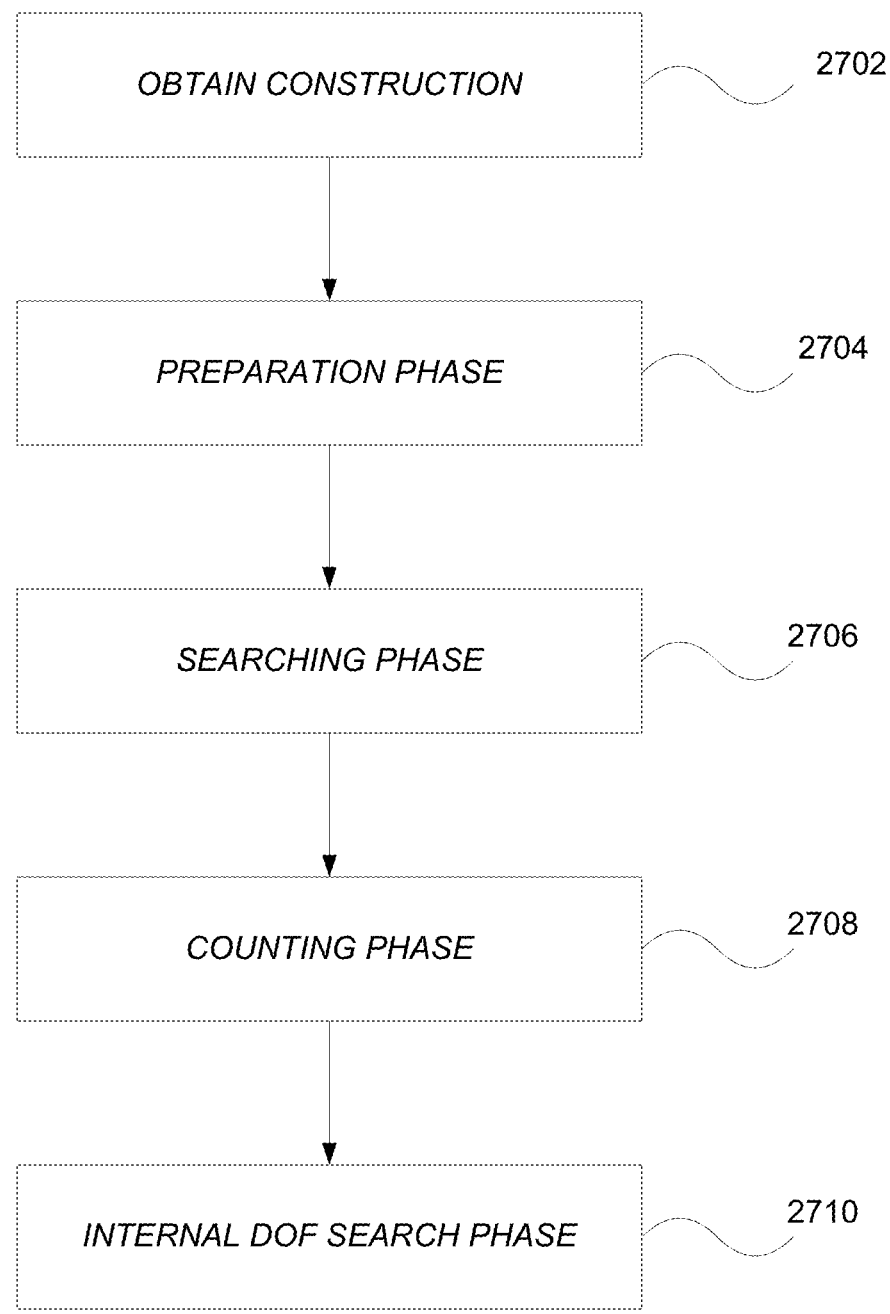
FIG. 27 illustrates the overall logical flow for computing the graph based DOF in accordance with one or more embodiments of the invention.

In view of the above described steps, FIG. 27 illustrates the overall logical flow for computing the graph based DOF in accordance with one or more embodiments of the invention.

At step 2702, a construction graph is obtained.

At step 2704, the preparation phase is conducted. As described above, in the preparation phase, the construction primitives are converted into graph primitives.

At step 2706, the search phase is conducted. During the search phase, all compact sub graphs are identified from the input graph (i.e., the graph produced from the preparation phase 2704).

At step 2708, the counting phase is conducted. In the counting phase, the DOF number is calculated. The counting phase includes the steps of calculating the DOF for each compact sub graph as well as computing the DOF for all compact components that interact with each other. The computation of the DOF for the compact components that interact with each other serves to spread the lock of each component.

At step 2710, the internal DOF search phase is conducted. The internal DOF search determines whether a component is over constrained or not. If over constrained, this step may further provide the ability to remove one or more edges from the compact sub graph as necessary.

In view of the above, based on the mapping/correspondence between the graph structure and construction structure, as well as the DOF computation, a determination can be made regarding whether a construction can change its structure or not. Further, the reason for why a particular construction is over constrained may be determined. Prior art solutions failed to compute the DOF for all components in a construction. The present invention enables such a computation in a fast, efficient, and dynamic manner.

Once the DOF for the construction model is complete, the structure of the construction model may be modified and output, transmitted, displayed, etc. Accordingly, embodiments of the invention enable a system for computing whether and how to change a construction model (i.e., the structure of a construction model) based on a graph structure and a computation of a degree of freedom for the model and all sub graphs in the model.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to compute a DOF for a construction. To perform such a computation, construction elements are translated into a graph representation including fixed crossing joints and welded joints. The resulting compact sub graphs are searched using a variety of rules including the triangle rule, connecting edge rule, and hull rule. Locking freedom is evaluated using previously constructed structures (e.g., by decrementing the freedom counters and using a locking number). Lastly, an internal DOF counter is computed along with the ability to detect internal over constrained sub graphs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for utilizing a degree of freedom (DOF) for a construction comprising:
    (a) a preparation phase comprising constructing a graph structure from a construction model, wherein construction primitives are transformed into graph primitives, wherein the preparation phase further comprises:
    creating an empty graph structure; and
    traversing the construction model to populate the graph structure, the traversing comprising:
        creating a graph vertex for each joint in the construction model and adding the graph vertex to the graph structure;
        creating a graph edge for each beam in the construction model and adding the graph edge to the graph structure, wherein two or more graph vertices are used as ends of each graph edge;
        converting a crossing joint from the construction model into the graph structure; and
        converting a welded joint from the construction model into the graph structure;
    (b) a searching phase comprising identifying all compact sub-graphs of the graph structure, wherein one of the compact sub-graphs comprises a trivial compact graph comprising a triangle;
    (c) a counting phase comprising:
        calculating a DOF for each compact sub-graph; and
        adjusting the DOF for all compact sub-graphs based on interactions between the compact sub-graphs;
    (d) an internal DOF searching phase comprising:
        computing an internal DOF for each compact sub-graph, wherein the internal DOF determines whether the corresponding compact sub-graph is overconstrained; and
        solving an overconstrained compact sub-graph; and
    (e) outputting a determination regarding whether a structure of the construction model can be modified based on the DOF and internal DOF.

2. The computer-implemented method of claim 1, wherein:
    the crossing joint comprises a fixed crossing joint; and
    the fixed crossing joint is converted from the construction model into the graph structure by converting the fixed crossing joint into a triangle with an edge.

3. The computer-implemented method of claim 1, wherein:
the crossing joint comprises a fixed crossing joint that is on two crossing beams; and
the fixed crossing joint is converted from the construction model into the graph structure by converting the fixed crossing joint into two triangles that are connected together through the fixed crossing joint.

4. The computer-implemented method of claim 1, wherein:
the welded joint is converted from the construction model into the graph structure by creating graph edges representing connections between welded beams and adding the graph edges to the graph structure.

5. The computer-implemented method of claim 1, wherein a compact sub-graph comprises a sub-graph that comprises all triangles that share at least one graph edge.

6. The computer-implemented method of claim 1, wherein any graph edge, that connects two parts of a sub-graph that are already part of a single compact sub-graph, becomes part of the single compact sub-graph.

7. The computer-implemented method of claim 1, wherein a core of the compact sub-graph, a hull of the compact sub-graph, and connections between the hull and the core comprise a single compact sub-graph.

8. The computer-implemented method of claim 1, wherein the adjusting the DOF for all compact sub-graphs based on interactions between the compact sub-graphs comprises:
determining a locking number corresponding to each sub-graph DOF, wherein the locking number comprises how many DOF can be decreased from neighbors of each sub-graph; and
spreading a lock between one or more of the sub-graphs based on the locking numbers.

9. The computer-implemented method of claim 1, wherein the internal DOF for each compact sub-graph comprises 2 times a number of graph vertices minus a number of graph edges minus 3.

10. The computer-implemented method of claim 1, wherein the solving of the overconstrained compact sub-graph comprises:
iterating over graph edges of the overconstrained compact sub-graph to determine a list of removable graph edges; and
removing a graph edge identified in the list from the compact sub-graph.

11. A non-transitory computer readable storage medium encoded with computer program instructions which when accessed by a computer cause the computer to load the program instructions to a memory therein creating a special purpose data structure causing the computer to operate as a specially programmed computer, executing a method of utilizing a degree of freedom (DOF) for a construction, comprising:
(a) a preparation phase comprising constructing, in the specially programmed computer, a graph structure from a construction model, wherein construction primitives are transformed into graph primitives, wherein the preparation phase comprises:
creating an empty graph structure; and
traversing the construction model to populate the graph structure, the traversing comprising:
creating a graph vertex for each joint in the construction model and adding the graph vertex to the graph structure;
creating a graph edge for each beam in the construction model and adding the graph edge to the graph structure, wherein two or more graph vertices are used as ends of each graph edge;
converting a crossing joint from the construction model into the graph structure;
converting a welded joint from the construction model into the graph structure;
(b) a searching phase comprising identifying, in the specially programmed computer, all compact sub-graphs of the graph structure, wherein one of the compact sub-graphs comprises a trivial compact graph comprising a triangle;
(c) a counting phase comprising:
calculating, in the specially programmed computer, a DOF for each compact sub-graph; and
adjusting, in the specially programmed computer, the DOF for all compact sub-graphs based on interactions between the compact sub-graphs;
(d) an internal DOF searching phase comprising:
computing, in the specially programmed computer, an internal DOF for each compact sub-graph, wherein the internal DOF determines whether the corresponding compact sub-graph is overconstrained; and
solving, in the specially programmed computer, an overconstrained compact sub-graph; and
(e) outputting, in the specially programmed computer, a determination regarding whether a structure of the construction model can be modified based on the DOF and internal DOF.

12. The non-transitory computer readable storage medium of claim 11, wherein:
the crossing joint comprises a fixed crossing joint; and
the fixed crossing joint is converted from the construction model into the graph structure by converting the fixed crossing joint into a triangle with an edge.

13. The non-transitory computer readable storage medium of claim 11, wherein:
the crossing joint comprises a fixed crossing joint that is on two crossing beams; and
the fixed crossing joint is converted from the construction model into the graph structure by converting the fixed crossing joint into two triangles that are connected together through the fixed crossing joint.

14. The non-transitory computer readable storage medium of claim 11, wherein:
the welded joint is converted from the construction model into the graph structure by creating graph edges representing connections between welded beams and adding the graph edges to the graph structure.

15. The non-transitory computer readable storage medium of claim 11, wherein a compact sub-graph comprises a sub-graph that comprises all triangles that share at least one graph edge.

16. The non-transitory computer readable storage medium of claim 11, wherein any graph edge, that connects two parts of a sub-graph that are already part of a single compact sub-graph, becomes part of the single compact sub-graph.

17. The non-transitory computer readable storage medium of claim 11, wherein a core of the compact sub-graph, a hull of the compact sub-graph, and connections between the hull and the core comprise a single compact sub-graph.

18. The non-transitory computer readable storage medium of claim 11, wherein the adjusting the DOF for all compact sub-graphs based on interactions between the compact sub-graphs comprises:
determining a locking number corresponding to each sub-graph DOF, wherein the locking number comprises how many DOF can be decreased from neighbors of each sub-graph; and
spreading a lock between one or more of the sub-graphs based on the locking numbers.

19. The non-transitory computer readable storage medium of claim 11, wherein the internal DOF for each compact sub-graph comprises 2 times a number of graph vertices minus a number of graph edges minus 3.

20. The non-transitory computer readable storage medium of claim 11, wherein the solving of the overconstrained compact sub-graph comprises:
   iterating over graph edges of the overconstrained compact sub-graph to determine a list of removable graph edges; and
   removing a graph edge identified in the list from the compact sub-graph.

* * * * *